US012017677B2

(12) United States Patent
Xiao

(10) Patent No.: US 12,017,677 B2
(45) Date of Patent: Jun. 25, 2024

(54) SENSING METHOD, INTELLIGENT CONTROL DEVICE AND AUTONOMOUS DRIVING VEHICLE

(71) Applicant: SHENZHEN GUO DONG INTELLIGENT DRIVE TECHNOLOGIES CO., LTD, Shenzhen (CN)

(72) Inventor: Jianxiong Xiao, Shenzhen (CN)

(73) Assignee: SHENZHEN GUO DONG INTELLIGENT DRIVE TECHNOLOGIES CO., LTD, Shenzhen (CN)

( * ) Notice: Subject to any disclaimer, the term of this patent is extended or adjusted under 35 U.S.C. 154(b) by 466 days.

(21) Appl. No.: 17/343,692

(22) Filed: Jun. 9, 2021

(65) Prior Publication Data
US 2022/0001891 A1 Jan. 6, 2022

(30) Foreign Application Priority Data
Jul. 6, 2020 (CN) .......................... 202010637886.6

(51) Int. Cl.
*B60W 60/00* (2020.01)
*G01C 21/34* (2006.01)
(Continued)

(52) U.S. Cl.
CPC ....... *B60W 60/001* (2020.02); *G01C 21/3461* (2013.01); *G01C 21/3691* (2013.01);
(Continued)

(58) Field of Classification Search
CPC .......... G01S 13/931; G01S 2013/9322; G01S 13/52; G01S 13/862; G01S 13/865; G01S 13/867; G01S 13/89; G01S 2013/9316; G01S 2013/932; G01S 2013/93273; G01S 7/003; G01S 7/295; G01S 7/40; G01C 21/3407; G01C 21/3461; G01C 21/3691; G08G 1/01; G05D 1/0214;
(Continued)

(56) References Cited

U.S. PATENT DOCUMENTS 11,796,326 B1 * 10/2023 Sharma .............. G01C 21/3661
2017/0299707 A1 * 10/2017 Nguyen .................... B60T 7/12
(Continued)

*Primary Examiner* — Timothy X Pham
(74) *Attorney, Agent, or Firm* — Zhigang Ma

(57) ABSTRACT

A sensing method for an autonomous driving vehicle includes steps of: obtaining an instruction; driving a center sensor assembly, or a center sensor assembly to sense corresponding areas to obtain first road condition data; judging whether a first occlusion area appears in the first road condition data; calculating a first safety area when a first occlusion area appears in the first road condition data; planning a first execution instruction; controlling the autonomous driving vehicle to motion in the first safety area; driving the at least one edge sensor assembly, or driving the at least one edge sensor assembly and the center sensor assembly to obtain second road condition data; judging whether a second occlusion area appears in the second road condition data; and planning a second execution instruction to control the autonomous driving vehicle to motion when a second occlusion area appears in the second road condition data.

14 Claims, 10 Drawing Sheets

(51) Int. Cl.
    *G01C 21/36*     (2006.01)
    *G01S 13/89*     (2006.01)
    *G01S 13/931*    (2020.01)
    *G05D 1/00*      (2024.01)

(52) U.S. Cl.
    CPC ............ *G01S 13/89* (2013.01); *G01S 13/931* (2013.01); *G05D 1/0214* (2013.01); *G01S 2013/93273* (2020.01)

(58) Field of Classification Search
    CPC ......... B60W 2554/20; B60W 2556/40; B60W 60/001; B60W 60/0015
    See application file for complete search history.

(56) References Cited

U.S. PATENT DOCUMENTS

2020/0070822 A1* 3/2020 Yamada .......... B60W 60/00274
2021/0403050 A1* 12/2021 Gan ................. G06V 20/58
2023/0055708 A1* 2/2023 Lee .................. B60W 60/001

\* cited by examiner

SENSING METHOD, INTELLIGENT CONTROL DEVICE AND AUTONOMOUS DRIVING VEHICLE

CROSS REFERENCE TO RELATED APPLICATION

This non-provisional patent application claims priority under 35 U.S.C. § 119 from Chinese Patent Application No. 202010637886.6 filed on Jul. 6, 2020, the entire content of which is incorporated herein by reference.

TECHNICAL FIELD

The disclosure relates to the field of autonomous driving technology, and in particular to a sensing method, an intelligent control device and an autonomous driving vehicle.

BACKGROUND

Nowadays, vehicles with a level-four or a level-five autonomous driving system having a camera, a lidar, a positioning device and so on mounted to the center of the vehicles roof as center sensors, and cameras mounted to front, back and side edge of car body to sense blind areas around the car body. However, the center sensors usually blocked by other dynamic or static objects, which prevents cameras, lidars, millimeter-wave radars and other sensors contained in the center sensors from sensing. For example, when there are large vehicles (buses, trucks, etc.) in front of a vehicle with the autonomous driving system during driving, traffic lights in front of the vehicle will be blocked. So that the center sensors installed in the vehicle cannot obtain and sense real road condition information, it is difficult for the autonomous driving system to make a decision and plan.

SUMMARY

It is necessary to provide a sensing method, an intelligent control device and an autonomous driving vehicle, so that the autonomous driving vehicle can sense in advance and enhance safety performance of the autonomous driving vehicle.

A first aspect of the disclosure provides a sensing method for an autonomous driving vehicle. The method includes steps of: obtaining an instruction to be executed; driving a center sensor assembly, or driving a center sensor assembly and at least one edge sensor assembly to sense corresponding areas to obtain first road condition data according to the instruction to be executed; judging whether a first occlusion area appears in the first road condition data; calculating a first safety area according to a high-precision map, the first road condition data, and a first preset algorithm when a first occlusion area appears in the first road condition data; planning a first execution instruction according to the instruction to be executed, the first road condition data, a driving state of the autonomous driving vehicle, and the first safety area; controlling the autonomous driving vehicle to motion in the first safety area according to the first execution instruction; driving the at least one edge sensor assembly, or driving the at least one edge sensor assembly and the center sensor assembly to sense the corresponding areas to obtain second road condition data according to the first execution instruction; judging whether a second occlusion area appears in the second road condition data; and planning a second execution instruction according to the second road condition data and the driving state of the autonomous driving vehicle to control the autonomous driving vehicle to motion according to the second execution instruction when a second occlusion area appears in the second road condition data.

A second aspect of the disclosure provides an intelligent control device. The intelligent control device comprises a memory configured to store program instructions; and one or more processors configured to execute the program instructions to enable the intelligent control device to perform sensing method for an autonomous driving vehicle, wherein the sensing method comprises the steps of: obtaining an instruction to be executed; driving a center sensor assembly, or driving a center sensor assembly and at least one edge sensor assembly to sense corresponding areas to obtain first road condition data according to the instruction to be executed; judging whether a first occlusion area appears in the first road condition data; calculating a first safety area according to a high-precision map, the first road condition data, and a first preset algorithm when a first occlusion area appears in the first road condition data; planning a first execution instruction according to the instruction to be executed, the first road condition data, a driving state of the autonomous driving vehicle, and the first safety area; controlling the autonomous driving vehicle to motion in the first safety area according to the first execution instruction; driving the at least one edge sensor assembly, or driving the at least one edge sensor assembly and the center sensor assembly to sense the corresponding areas to obtain second road condition data according to the first execution instruction; judging whether a second occlusion area appears in the second road condition data; and planning a second execution instruction according to the second road condition data and the driving state of the autonomous driving vehicle to control the autonomous driving vehicle to motion according to the second execution instruction when a second occlusion area appears in the second road condition data.

A third aspect of the disclosure provides an autonomous driving vehicle. The autonomous driving vehicle comprises a car body, a center sensor assembly setting on roof of the car body, at least one edge sensor assembly setting around the car body, and an intelligent control device, the intelligent control device comprising a memory configured to store program instructions and one or more processors configured to execute the program instructions to enable the intelligent control device to perform sensing method for an autonomous driving vehicle, wherein the sensing method comprises the steps of: obtaining an instruction to be executed; driving a center sensor assembly, or driving a center sensor assembly and at least one edge sensor assembly to sense corresponding areas to obtain first road condition data according to the instruction to be executed; judging whether a first occlusion area appears in the first road condition data; calculating a first safety area according to a high-precision map, the first road condition data, and a first preset algorithm when a first occlusion area appears in the first road condition data; planning a first execution instruction according to the instruction to be executed, the first road condition data, a driving state of the autonomous driving vehicle, and the first safety area; controlling the autonomous driving vehicle to motion in the first safety area according to the first execution instruction; driving the at least one edge sensor assembly, or driving the at least one edge sensor assembly and the center sensor assembly to sense the corresponding areas to obtain second road condition data according to the first execution instruction; judging whether a second occlusion area appears in the second road condition data; and planning a second execution instruction according to the second road condition data and the driving state of the autonomous driving vehicle to control the autonomous driving vehicle to motion according to the second execution instruction when a second occlusion area appears in the second road condition data.

As described above, the method using the edge sensors to sense in advance, uses the edge sensors coordinate with the center sensors to sense. When the center sensor assembly is blocked by barriers, the edge sensors can sense area that the center sensors cannot sense. So as to enlarge sensing range of the autonomous driving vehicle and improve safety performance of the autonomous driving vehicle. In addition, the edge sensors are used to interactively and incrementally detect occlusion area to avoid large motion of the autonomous driving vehicle, so that recognition is not required to wait until the center sensors arrives at the same position. In other words, the sensing method of this disclosure can sense in advance to enable autonomous driving system make decisions earlier and faster.

DETAILED DESCRIPTION OF THE EMBODIMENTS

In order to make purpose, technical solution and advantages of the disclosure more clearly, the disclosure is further described in detail in combination with drawings and embodiments. It is understood that the specific embodiments described herein are used only to explain the disclosure and are not used to define it. On the basis of the embodiments in the disclosure, all other embodiments obtained by ordinary technicians in this field without any creative effort are covered by protection of the disclosure.

Terms "first", "second", "third", "fourth", if any, in specification, claims and drawings of this application are used to distinguish similar objects and need not be used to describe any particular order or sequence of priorities. It should be understood that data are interchangeable when appropriate, in other words, the embodiments described can be implemented in order other than what is illustrated or described here. In addition, terms "include" and "have" and any variation of them, can encompass other things. For example, processes, methods, systems, products, or equipment that comprise a series of steps or units need not be limited to those clearly listed, but may include other steps or units that are not clearly listed or are inherent to these processes, methods, systems, products, or equipment.

It is to be noted that description refers to "first", "second", etc. in the disclosure are for descriptive purpose only and neither be construed or implied relative importance nor indicated as implying number of technical features. Thus, feature defined as "first" or "second" can explicitly or implicitly include one or more features. In addition, technical solutions between embodiments may be integrated, but only on the basis that they can be implemented by ordinary technicians in this field. When the combination of technical solutions is contradictory or impossible to be realized, such combination of technical solutions shall be deemed to be non-existent and not within the scope of protection required by the disclosure.

Figure 1:
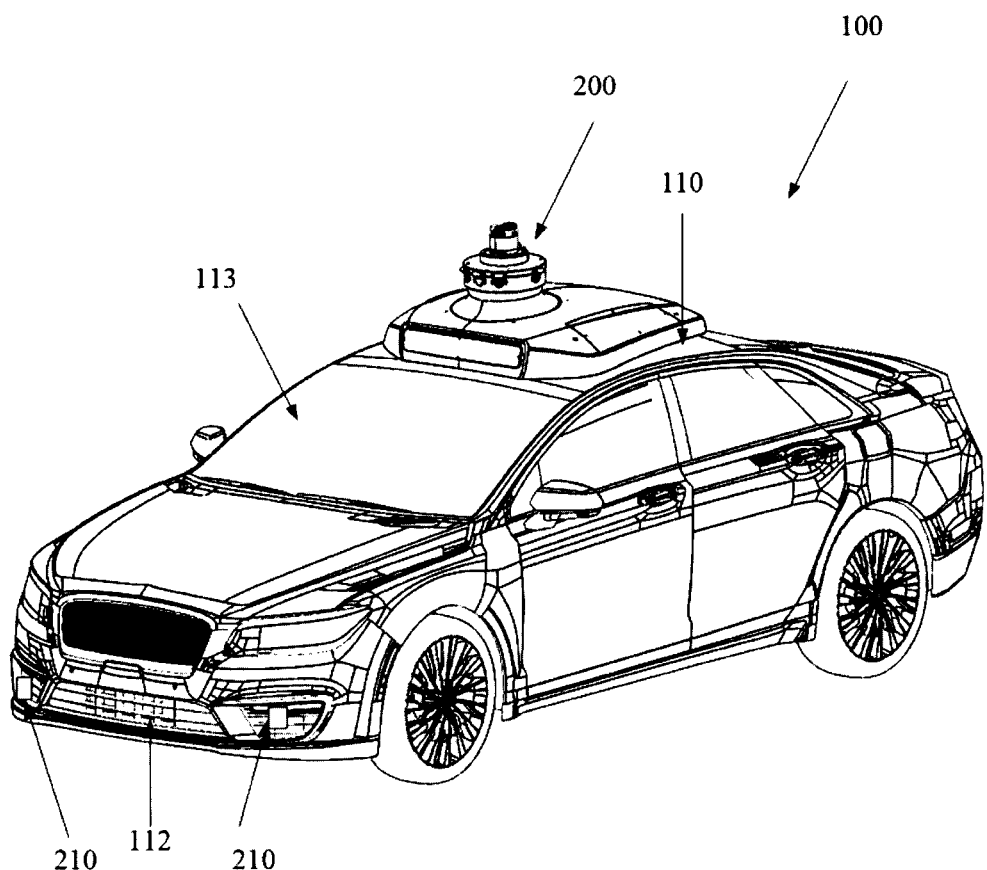
FIG. 1 illustrates a schematic diagram of an autonomous driving vehicle.

Referring to FIG. 1, FIG. 1 illustrates a schematic diagram of an autonomous driving vehicle. An autonomous driving vehicle 100 is a vehicle that automatically transports users from one location to another without human control. In some embodiments, the autonomous driving vehicle 100 can be a motorcycle, a truck, a sport utility vehicle, a recreational vehicle, a ship, an aircraft and other transportation equipment. In some embodiments, the autonomous driving vehicle 100 has a level-four or a level-five autonomous driving system. The level-four autonomous driving system refers to "high automation". Generally, a vehicle with the level-four autonomous driving system can make decisions automatically without any operation from a human driver. The vehicle depends on road information data updated at actual time to realize real travelling scenarios such as pickup and return itself automatically, formation cruise automatically and avoid obstacle automatically. The level-five autonomous driving system refers to "full automation". Generally, a vehicle with the level-five autonomous driving system can drive all-weather and all-region automatically and respond to changes in environmental climate and geographical location without any operation from the human driver, while the human driver can rest or focus on other works.

Figure 2A:
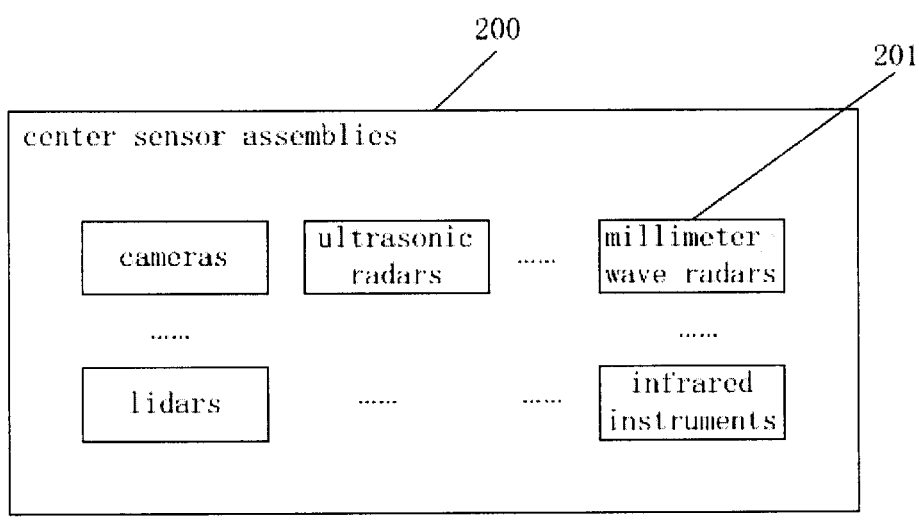
FIG. 2A illustrates a schematic diagram of a center sensor assembly.
Figure 2B:
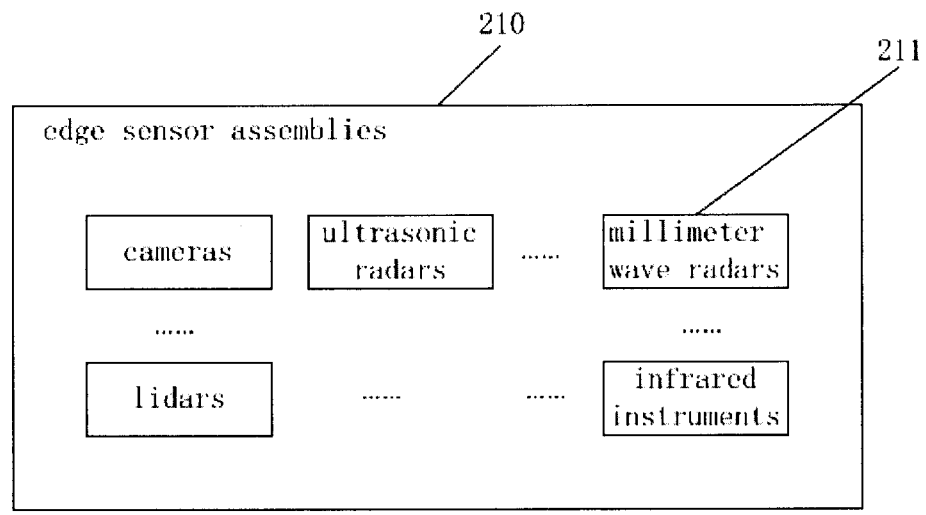
FIG. 2B illustrates a schematic diagram of at least one edge sensor assembly.

Referring to FIG. 2A and FIG. 2B, FIG. 2A illustrates a schematic diagram of a center sensor assembly and FIG. 2B illustrates a schematic diagram of at least one edge sensor assembly. In some embodiments, a center sensor assembly 200 comprises one or more center sensors 201. At least one edge sensor assembly 210 comprises one or more edge sensors 211. The center sensors 201 and the edge sensors 211 include but not limited to cameras, lidars, ultrasonic radars, millimeter-wave radars and infrared instrument. The center sensors 201 may be fixed or rotatable relative to the center sensor assembly 200. The edge sensors 211 may be fixed or rotatable relative to the at least one edge sensor assembly 210. The center sensor assembly 200 and the at least one edge sensor assembly 210 are fixed relative to the autonomous driving vehicle 100. The center sensor assembly 200 and the at least one edge sensor assembly 210 are configured to sense external environment of the autonomous driving vehicle 100 to obtain sensing data at actual time.

The center sensor assembly 200 is installed on the roof 110 of car body of the autonomous driving vehicle 100. In detail, the center sensor assembly 200 is installed in the center of the roof 110 of the autonomous driving vehicle 100 as shown in FIG. 1. The at least one edge sensor assembly 210 is installed around the car body of the autonomous driving vehicle 100. In detail, the at least one edge sensor assembly 210 can be installed in the space of car body between front bumper 112 and front windshield 113, or between rear bumper and rear windshield of the autonomous driving vehicle 100 in a hidden way. The at least one edge sensor assembly 210 can also be installed at a distance below front and rear headlights.

Figure 3:
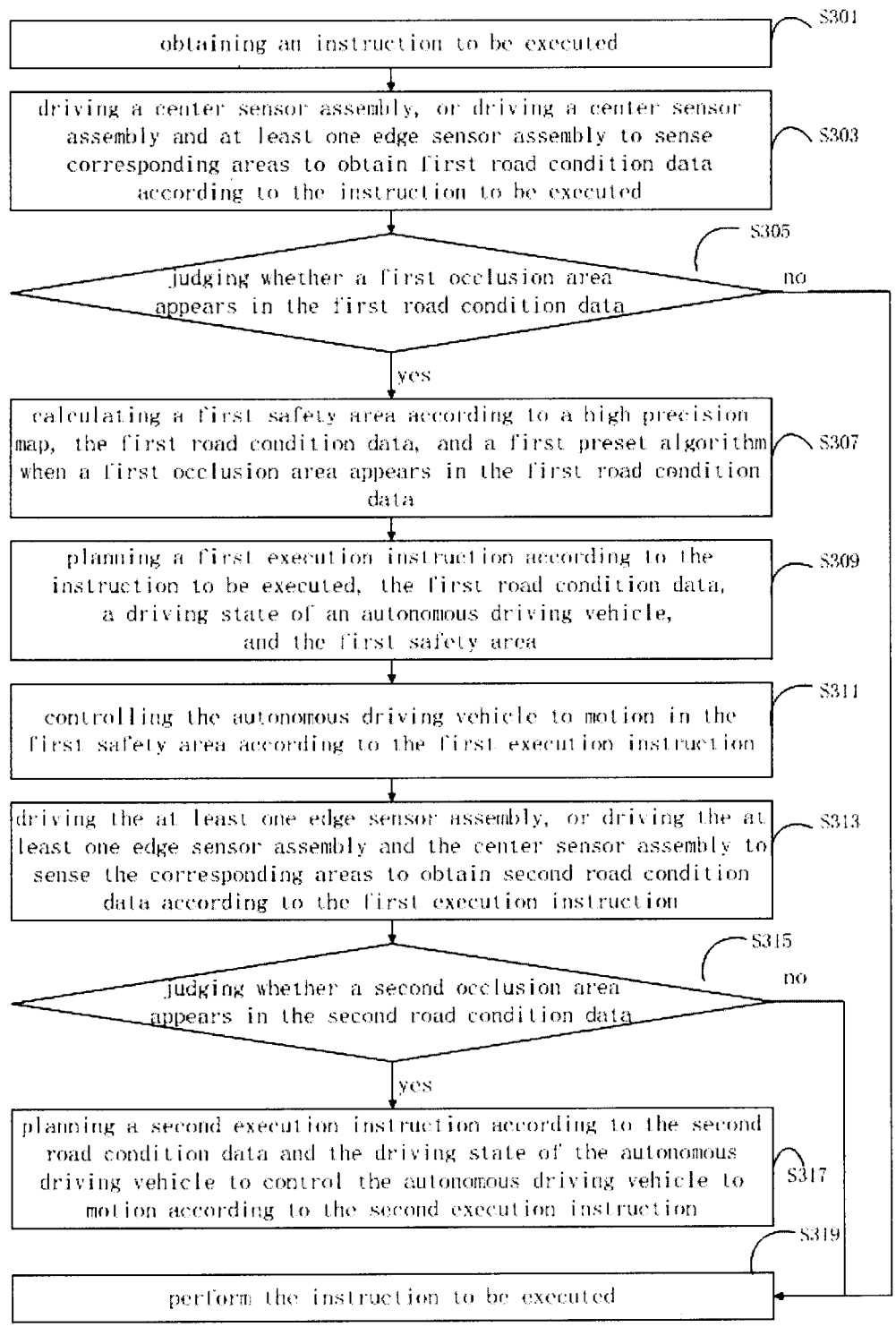
FIG. 3 illustrates a flow diagram of a sensing method in accordance with an embodiment.

Referring to FIG. 3, FIG. 3 illustrates a flow diagram of a sensing method in accordance with an embodiment.

In step S301, obtaining an instruction to be executed. The instruction to be executed of the autonomous driving vehicle at next time node can be obtained according to map information of driving route of the autonomous driving vehicle and environment information fed back by the center sensors of the autonomous driving vehicle. The instruction to be executed includes but not limited to a drivable path, a key perception area, a driving speed, and time required to drive to next path. The drivable path is optimal path after each path is evaluated based on cost function. The cost function utilizes factors to evaluate each path. The factors may be smoothness, safety, deviation from center of lane and other factors that vehicle developers consider. The cost function is capable of arranging the paths according to cost and selecting a path with the lowest cost as the drivable path. In other embodiments, other factors such as distances from obstacles, changes in speed and curvature, pressure on vehicles and other desirable factors also can be utilized in the cost function.

Figure 2C:
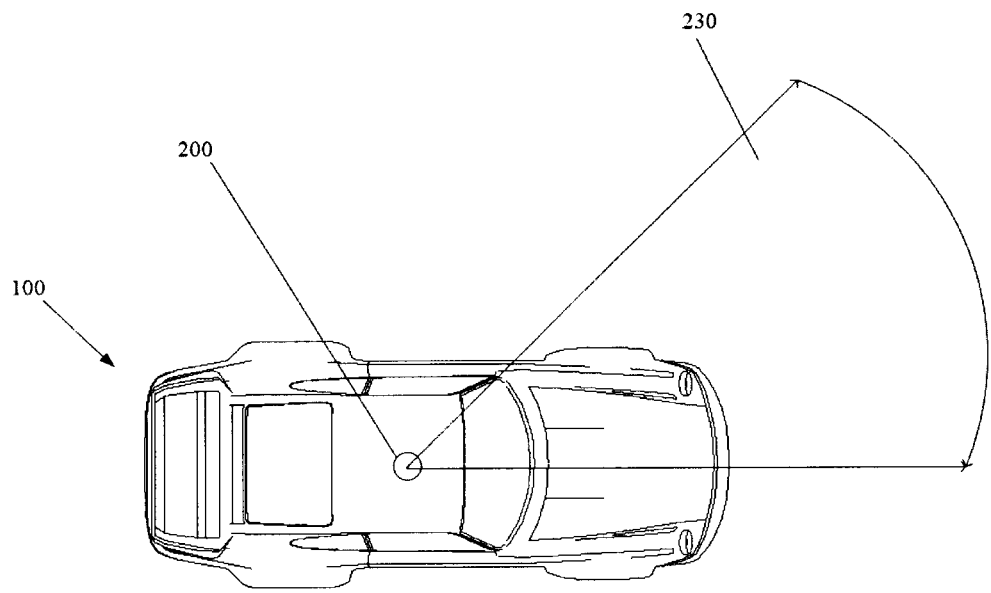
FIG. 2C illustrates a schematic diagram of a key perception area.

The key perception area is an area needs to be sensed and detected whether there is obstacle. The key perception area is determined by the autonomous driving vehicle 100 during driving based on a driving route on which the autonomous driving vehicle 100 is driving. Referring to FIG. 2C, the key perception area 230 is a fan-shaped area with preset radius. The fan-shaped area is centered on the center sensor assembly 200 and is at a specified angle with a reference direction. The reference direction is a tangent direction of a reference line of the autonomous driving vehicle 100 in Frenet coordinate system. The Frenet coordinate system uses center of road as the reference line.

In step S303, driving a center sensor assembly, or driving a center sensor assembly and at least one edge sensor assembly to sense corresponding areas to obtain first road condition data according to the instruction to be executed. Sensors matching with the key perception area are selected according to the key perception area. Angles of the selected sensors or driving angle of the autonomous driving vehicle 100 are adjusted dynamically according to the drivable path. The sensors include but not limited to cameras, ultrasonic radars, millimeter-wave radars, lidars, and infrared instruments. The cameras are mainly used in short distance scenes and can identify obstacles. The ultrasonic radars are mainly used in short distance scenes. The millimeter-wave radars mainly include 24 GHz radar for short and medium distance measurement and 77 GHz radar for long distance measurement. The millimeter-wave radars can effectively extract depth of field and speed information, and identify obstacles. The lidars include single-line lidars and multi-line lidars. The multi-line lidars can obtain extremely high speed, distance, and angle resolution to form accurate 3D map, and have strong anti-interference ability. The infrared instruments are mainly used in night scenes.

In detail, the key perception area is directly in front of driving direction of the autonomous driving vehicle when the autonomous driving vehicle is driving straight on highway. The 77 GHz millimeter-wave radar of the center sensor assembly is mainly responsible for sensing the key perception area. The 77 GHz millimeter-wave radar of the center sensor assembly, or the 77 GHz millimeter-wave radar of the center sensor assembly and the at least one edge sensor assembly sense range of 100 meters in the driving direction of the autonomous driving vehicle to obtain the first road condition data. The first road condition data includes but not limited to point cloud data and image data.

In step S305, judging whether a first occlusion area appears in the first road condition data. HD Map ROI (region of interest) is used to obtain input point index defined by high-precision map in the key perception area according to the point cloud data, the image data, and the area corresponding to the key perception area in the high-precision map. A set of targets corresponding to obstacles in the key perception area are obtained based on the input point index, the point cloud data, and the image data. Target construction algorithm will establish obstacle contours for the detected obstacles. The target construction algorithm will also establish obstacle contours for the obstacles marked in the high-precision map and the obstacles transmitted by vehicle-road collaborative system (V2X). Closed area formed by the obstacle contours is the occlusion area. Information contained in the occlusion area includes obstacle type, obstacle size, obstacle trajectory, and obstacle prediction trajectory. The obstacle type includes but not limited to motor vehicle obstacle, pedestrian obstacle, other non-motor vehicle, and non-pedestrian static obstacle, etc. When there is no closed area formed by the obstacle contours, there is no first occlusion area, and step S319 is performed. When there is a closed area formed by the obstacle contours, the first occlusion area exists, and step S307 is performed.

The vehicle-road collaborative system (V2X) refers to system using advanced wireless communication and new generation Internet technologies that fully implement dynamic real-time information interaction between vehicles, vehicles and roads, and carry out active vehicle safety control and road collaborative management based on the collection and fusion of all-time-space dynamic traffic information. The vehicle-road collaborative system (V2X) fully realizes effective coordination of people, vehicles, and roads, can ensure traffic safety, improve traffic efficiency, and form a safe, efficient and environmentally friendly road traffic system.

In step S307, calculating a first safety area according to a high-precision map, the first road condition data, and a first preset algorithm when a first occlusion area appears in the first road condition data. Range of the first safety area is calculated through the first preset algorithm according to the drivable path of the autonomous driving vehicle on the high-precision map, boundary data of the first occlusion area, and environment data of the autonomous driving vehicle. The first preset algorithm is an algorithm for planning areas. The first safety area is a drivable area without occlusion constructed based on the high-precision map and environment data fed back from current sensors.

In step S309, planning a first execution instruction according to the instruction to be executed, the first road condition data, a driving state of an autonomous driving vehicle, and the first safety area. For example, D-star algorithm can be used to plan the first execution instruction according to the instruction to be executed, the first road condition data, the driving state of an autonomous driving vehicle, and the first safety area. The D-star algorithm is an algorithm that uses environment data sensed currently for incremental planning when sensing range is limited. According to movement distance and direction of the autonomous driving vehicle calculated by the D-Star algorithm, execution instruction such as accelerator, a brake, or a steering torque is estimated. The first execution instruction includes but not limited to specify enabled sensor assembly, and specify sensors of the enabled sensor assembly. When the specified sensors of the enabled sensor assembly are rotatable sensors, rotation angles of the selected sensors, the accelerator, the brake, or the steering torque is specified.

In step S311, controlling the autonomous driving vehicle to motion in the first safety area according to the first execution instruction. In detail, the autonomous driving vehicle move specific distance within the first safety area according to the accelerator and the steering torque of the first execution instruction.

In step S313, driving the at least one edge sensor assembly, or driving the at least one edge sensor assembly and the center sensor assembly to sense the corresponding areas to obtain second road condition data according to the first execution instruction. After the autonomous driving vehicle motioned according to the first execution instruction, a relative position of the autonomous driving vehicle and the occlusion area changes. The sensing range of the sensor assembly of the autonomous driving vehicle change, and the sensor assembly update the point cloud data and the image data.

In step S315, judging whether a second occlusion area appears in the second road condition data. HD Map ROI (region of interest) is used to obtain input point index defined by high-precision map in the key perception area according to the point cloud data, the image data, and the area corresponding to the key perception area in the high-precision map. A set of targets corresponding to obstacles in the key perception area are obtained based on the input point index, the point cloud data, and the image data. Target construction algorithm will establish obstacle contours for the detected obstacles. The target construction algorithm will also establish obstacle contours for the obstacles marked in the high-precision map and the obstacles transmitted by vehicle-road collaborative system (V2X). Closed area formed by the obstacle contours is the occlusion area. When there is no closed area formed by the obstacle contours, there is no second occlusion area, and step S319 is performed. When there is a closed area formed by the obstacle contours, the second occlusion area exists, and step S317 is performed.

In step S317, planning a second execution instruction according to the second road condition data and the driving state of the autonomous driving vehicle to control the autonomous driving vehicle to motion according to the second execution instruction when a second occlusion area appears in the second road condition data. The second execution instruction includes but not limited to specify enabled sensor assembly, and specify sensors of the enabled sensor assembly. When the specified sensors of the enabled sensor assembly are rotatable sensors, the rotation angles of the selected sensors, the accelerator, the brake, or the steering torque is specified. The autonomous driving vehicle move specific distance within the first safety area according to the accelerator and the steering torque of the second execution instruction.

In step S319, perform the instruction to be executed. The autonomous driving vehicle perform the instruction to be executed.

In some embodiments, autonomous driving system of the autonomous driving vehicle can loop above steps, continuously calculate new safety area, control the autonomous driving vehicle to motion in the safety area, and use the edge sensors to sense larger occlusion area.

Figure 4:
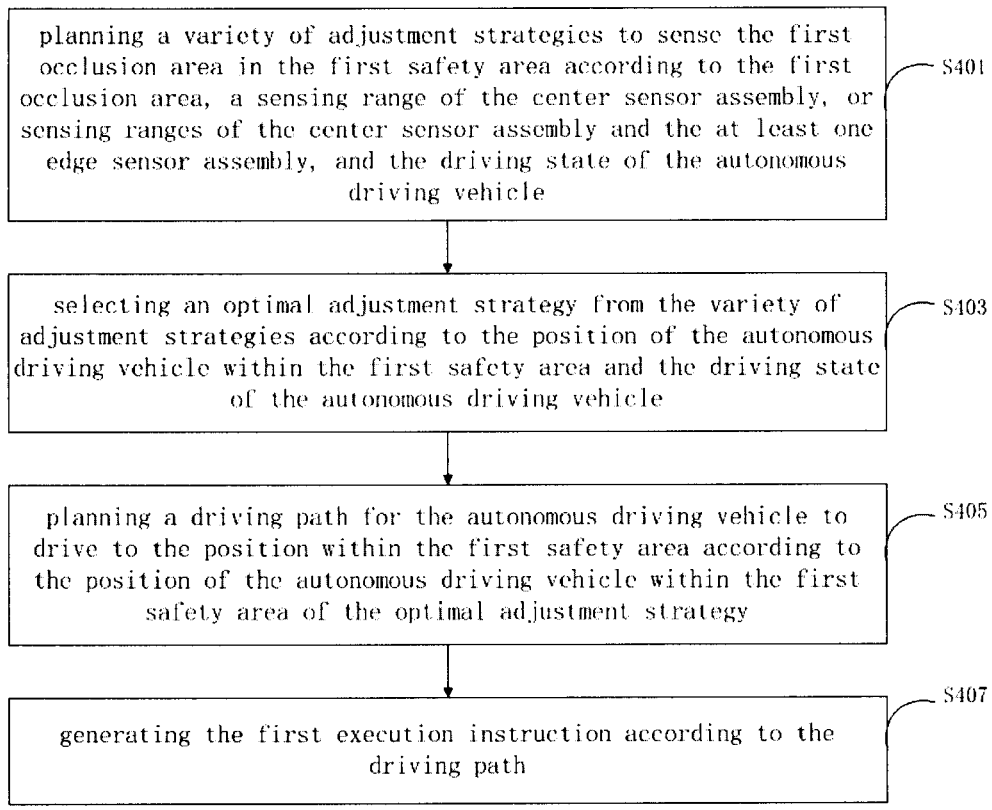
FIG. 4 illustrates a sub flow diagram of a sensing method in accordance with a first embodiment

Referring to FIG. 4, FIG. 4 illustrates a sub flow diagram of a sensing method in accordance with a first embodiment.

Figure 10A:
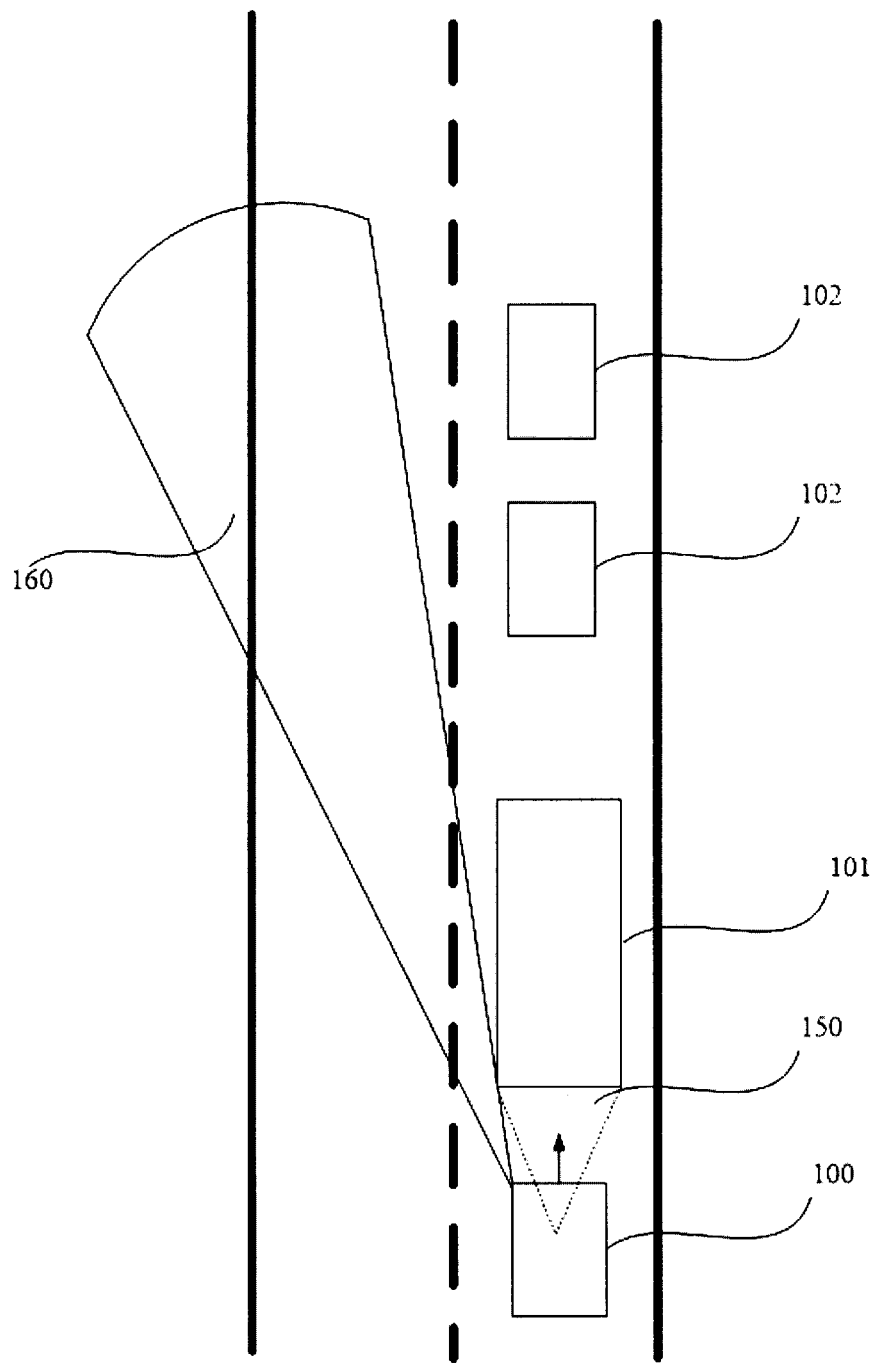
FIG. 10A-10E illustrate schematic diagrams of scenarios during perceiving.

In step S401, planning a variety of adjustment strategies to sense the first occlusion area in the first safety area according to the first occlusion area, a sensing range of the center sensor assembly, or sensing ranges of the center sensor assembly and the at least one edge sensor assembly, and the driving state of the autonomous driving vehicle. The adjustment strategies comprise selecting one or more of the edge sensors matching the first occlusion area from the one or more edge sensors, selecting angles of the one or more edge sensors, and selecting a position of the autonomous driving vehicle within the first safety area. In detail, as shown in FIG. 10A, the driving state of the autonomous driving vehicle 100 on highway is straight, and front of the autonomous driving vehicle 100 is blocked by truck 101, perception area blocked by truck body is the first occlusion area 150. The perception area of the 77 GHz millimeter-wave radar of the center sensor assembly is blocked, then the at least one edge sensor assembly is turned on to increase advance perception area 160. In some road conditions, it is still cannot determine the road conditions in front of driving road after turning on the at least one edge sensor assembly. For example, it cannot determine whether the truck 101 is waiting for a traffic light or temporarily parked, and whether there are other vehicles 102 in front of the truck 101 with uncertain driving states.

Position information of traffic lights marked on the high-precision map is used to assist the center sensor assembly and the at least one edge sensor assembly to sense surrounding environment of the autonomous driving vehicle. Whether there is a traffic light in front of the road where the autonomous driving vehicle is driving is confirmed according to locations of the traffic lights marked on the high-precision map and a current location of the autonomous driving vehicle 100. When there are traffic lights in front of a driving route, the locations of the traffic lights, flashing rules of the traffic lights, etc. are obtained. When there are no traffic lights in front of the driving route, the information that there are no traffic lights is fed back.

Methods to select sensors include but not limited methods as followed. 1) The 77 GHz millimeter-wave radar of the center sensor assembly is selected for sensing. 2) The 24 GHz millimeter-wave radar of the center sensor assembly is selected for sensing. 3) The 77 GHz millimeter-wave radar of the center sensor assembly, and the 77 GHz millimeter-wave radar of the at least one edge sensor assembly are selected for sensing. 4) The 24 GHz millimeter-wave radar of the center sensor assembly, and the 24 GHz millimeter-wave radar of the at least one edge sensor assembly are selected for sensing. Frequency of the millimeter-wave radar can be flexibly selected according to actual needs. Whether the selected sensors are rotatable sensors is confirmed according to sensors type. When the selected sensors are rotatable sensors, angles of the sensors are selected according to a location of the occlusion area in the vehicle coordinates. When the selected sensors are not rotatable sensors, the sensors are turned on to sense.

The position of the autonomous driving vehicle within the first safety area is the position of the autonomous driving vehicle within safety area built around the center sensor assembly at the next moment.

In step S403, selecting an optimal adjustment strategy from the variety of adjustment strategies according to the position of the autonomous driving vehicle within the first safety area and the driving state of the autonomous driving vehicle. When there are traffic lights in front of the driving route, the locations of the traffic lights, flashing rules of the traffic lights, etc. are obtained from the high-precision map.

The selected sensors of the center sensor assembly are adjusted to sense area in front, and the lidars of the corresponding area of the at least one edge sensor assembly are control to sense vehicles in left and right areas of the autonomous driving vehicle. When there are no traffic lights in front of the driving route, the lidars of the corresponding area of the at least one edge sensor assembly are control to sense vehicles in left and right areas of the autonomous driving vehicle, in order to reduce amount of calculation. In detail, when there are traffic lights in front of the driving route, the 24 GHz millimeter-wave radar of the center sensor assembly is used to sense distance between the autonomous driving vehicle and the truck in front based on an angle of 0° to the reference direction, and the 77 GHz millimeter-wave radar of the at least one edge sensor assembly is used to sense surrounding environment information of the autonomous driving vehicle based on an angle of 45° to the reference direction. The environment information includes but not limited to numbers of surrounding vehicles, driving states of the surrounding vehicles, whether there are pedestrians around, and etc.

In step S405, planning a driving path for the autonomous driving vehicle to drive to the position within the first safety area according to the position of the autonomous driving vehicle within the first safety area of the optimal adjustment strategy. In detail, the D-Star algorithm is used to calculate the driving path of the autonomous driving vehicle according to position information of the autonomous driving vehicle within the first safety area and current location information of the autonomous driving vehicle.

In step S407, generating the first execution instruction according to the driving path. The instructions in the above steps are integrated as the first execution instruction.

Figure 5:
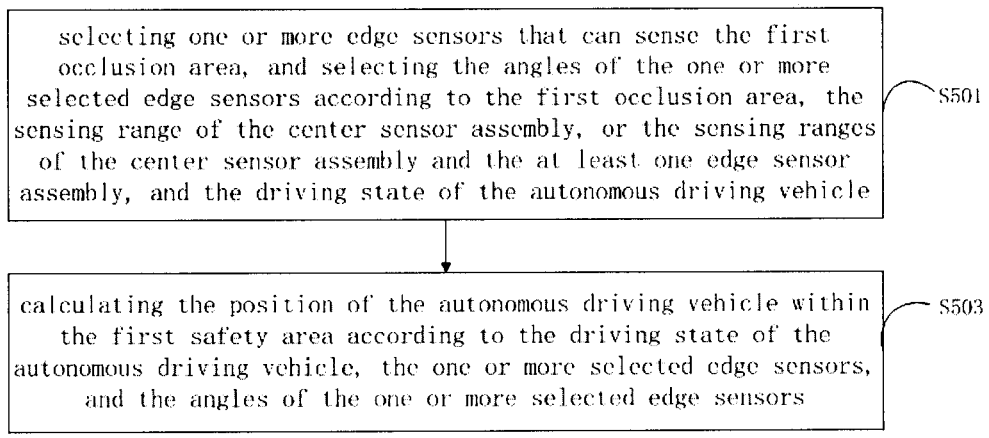
FIG. 5 illustrates a sub flow diagram of a sensing method in accordance with a second embodiment.

Referring to FIG. 5, FIG. 5 illustrates a sub flow diagram of a sensing method in accordance with a second embodiment.

In step S501, selecting one or more edge sensors that can sense the first occlusion area, and selecting the angles of the one or more selected edge sensors according to the first occlusion area, the sensing range of the center sensor assembly, or the sensing ranges of the center sensor assembly and the at least one edge sensor assembly, and the driving state of the autonomous driving vehicle. In detail, the autonomous driving vehicle is blocked by the truck in front of the driving direction during driving. The occlusion area cannot be eliminated by changing the types of the center sensors of the center sensor assembly, and the angles of the center sensors. The edge sensors of the at least one edge sensor assembly corresponding to the center sensor assembly are turned on. Driving in this environment, the autonomous driving vehicle needs to sense environment ahead. So that the angle of the edge sensor is 30° to the reference direction, which can bypass the truck in front to sense the environment in front of the autonomous driving vehicle.

In step S503, calculating the position of the autonomous driving vehicle within the first safety area according to the driving state of the autonomous driving vehicle, the one or more selected edge sensors, and the angles of the one or more selected edge sensors. In detail, the position of the autonomous driving vehicle within the first safety area is the position of the autonomous driving vehicle within safety area built around the center sensor assembly at the next moment. The position is a position that can expand sensing range of the sensors based on motion calculated by sensor data.

Figure 6:
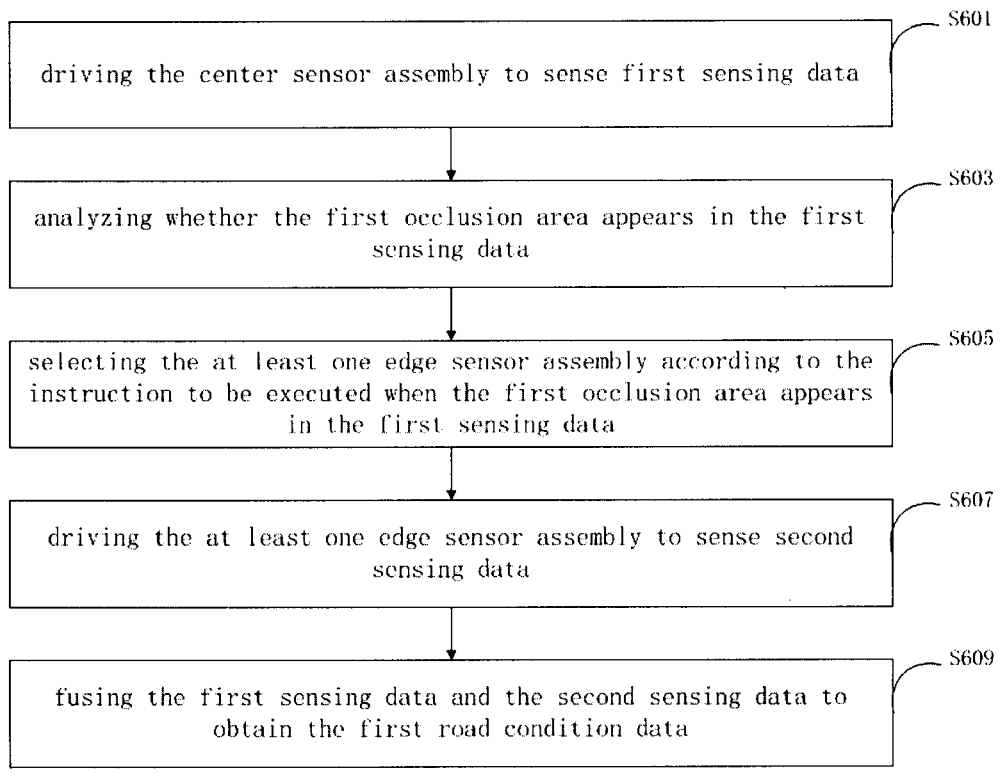
FIG. 6 illustrates a sub flow diagram of a sensing method in accordance with a third embodiment.

Referring to FIG. 6, FIG. 6 illustrates a sub flow diagram of a sensing method in accordance with a third embodiment.

In step S601, driving the center sensor assembly to sense first sensing data. In detail, when the autonomous driving vehicle is driving straight, the 77 GHz millimeter-wave radar of the center sensor assembly provides the point cloud data within 100 meters of tangent direction of the driving direction.

In step S603, analyzing whether the first occlusion area appears in the first sensing data. Whether there are obstacles, and types of obstacles are confirmed based on the point cloud data. Whether the first occlusion area appears is confirmed according to the type of obstacles.

In step S605, selecting the at least one edge sensor assembly according to the instruction to be executed when the first occlusion area appears in the first sensing data. In detail, the 77 GHz millimeter-wave radar of the at least one edge sensor assembly that mounted to both sides of the autonomous driving vehicle is selected to turn on according to the first occlusion area, in order to sense area in the tangent direction of the driving direction of the autonomous driving vehicle.

In step S607, driving the at least one edge sensor assembly to sense second sensing data. The 77 GHz millimeter-wave radar of the at least one edge sensor assembly mounted to both sides of the autonomous driving vehicle is used to obtain the point cloud data within 100 meters of the tangent direction of the driving direction based on an angle of 30° to the reference direction.

In step S609, fusing the first sensing data and the second sensing data to obtain the first road condition data. The point cloud data within 100 meters of the tangent direction of the driving direction obtained by the 77 GHz millimeter-wave radar of the center sensor assembly, and the point cloud data within 100 meters of the tangent direction of the driving direction obtained by the 77 GHz millimeter-wave radar of the at least one edge sensor assembly are fused to obtain point cloud data of a larger sensing range as the first road condition data.

Figure 7:
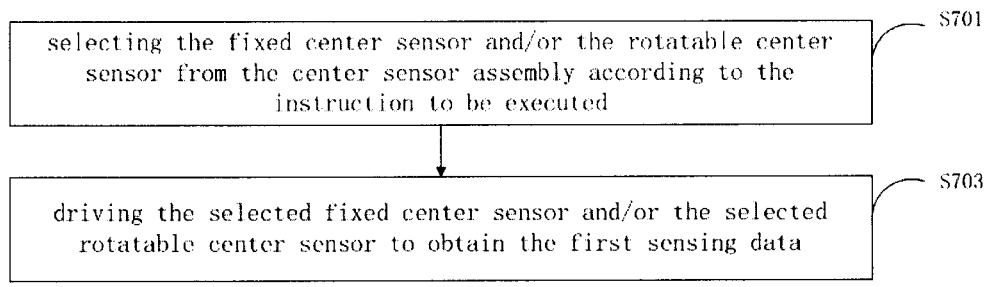
FIG. 7 illustrates a sub flow diagram of a sensing method in accordance with a fourth embodiment.

Referring to FIG. 7, FIG. 7 illustrates a sub flow diagram of a sensing method in accordance with a fourth embodiment.

In step S701, selecting the fixed center sensor and/or the rotatable center sensor from the center sensor assembly according to the instruction to be executed. In detail, the 77 GHz millimeter-wave radar is mainly responsible for detecting long-distance obstacles, and the 24 GHz millimeter-wave radar is mainly responsible for detecting short-distance obstacles. The center sensors are selected according to actual needs. When the selected center sensors are fixed relative to the center sensor assembly, the selected center sensors will directly start to sense. When the selected center sensors are rotatable relative to the center sensor assembly, the selected center sensors are driven to rotate to a specified angle before sensing.

In step S703, driving the selected fixed center sensor and/or the selected rotatable center sensor to obtain the first sensing data. In detail, the 77 GHz millimeter-wave radar of the center sensor assembly obtains the point cloud data within 100 meters of tangent direction of the driving direction.

Figure 8:
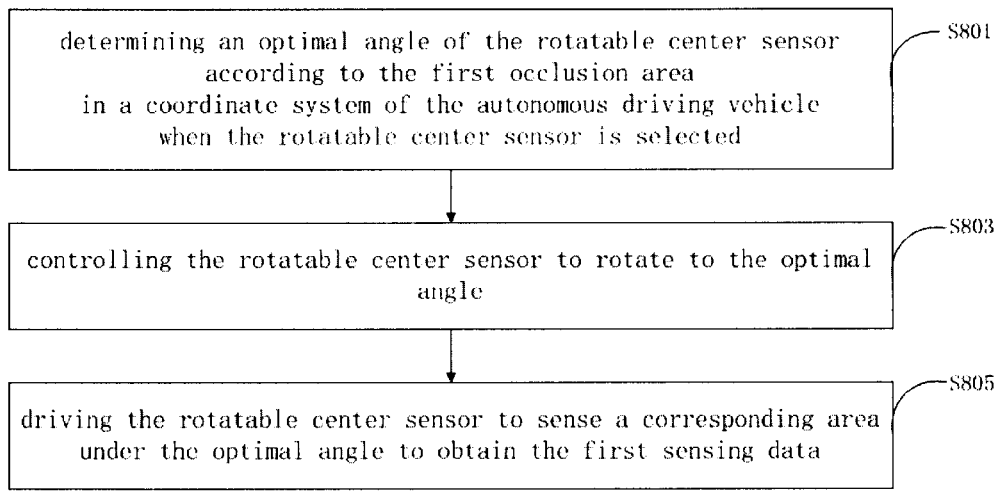
FIG. 8 illustrates a sub flow diagram of a sensing method in accordance with a fifth embodiment.

Referring to FIG. 8, FIG. 8 illustrates a sub flow diagram of a sensing method in accordance with a fifth embodiment.

In step S801, determining an optimal angle of the rotatable center sensor according to the first occlusion area in a coordinate system of the autonomous driving vehicle when the rotatable center sensor is selected. In detail, when the 77 GHz millimeter-wave radar of the center sensor assembly is used to sense area in front of the driving direction, the angle of the 77 GHz millimeter-wave radar is 0° to the reference direction. When the 77 GHz millimeter-wave radar of the center sensor assembly is used to sense area left front of the driving direction, the angle of the 77 GHz millimeter-wave radar is 45° to the reference direction.

In step S803, controlling the rotatable center sensor to rotate to the optimal angle.

In step S805, driving the rotatable center sensor to sense a corresponding area under the optimal angle to obtain the first sensing data. In detail, the 77 GHz millimeter-wave radar of the center sensor assembly obtains the point cloud data within 100 meters of the best angle direction.

The at least one edge sensor assembly are turned off when the first road condition data obtained by the center sensor assembly does not include the first occlusion area. The at least one edge sensor assembly are redundant sensor assembly for the autonomous driving vehicle. In a driving environment without obstacles, the autonomous driving vehicle can just depend on the center sensors to perform driving tasks. The at least one edge sensor assembly are turned off when the first road condition data obtained by the center sensor assembly does not include the first occlusion area in order to reduce the amount of calculation and resource scheduling cost. The at least one edge sensor assembly are turned on when the first road condition data obtained by the center sensor assembly include the first occlusion area in order to expand the sensing range of the center sensor assembly, and realize advance sensing of the at least one edge sensor assembly.

Figure 10B:
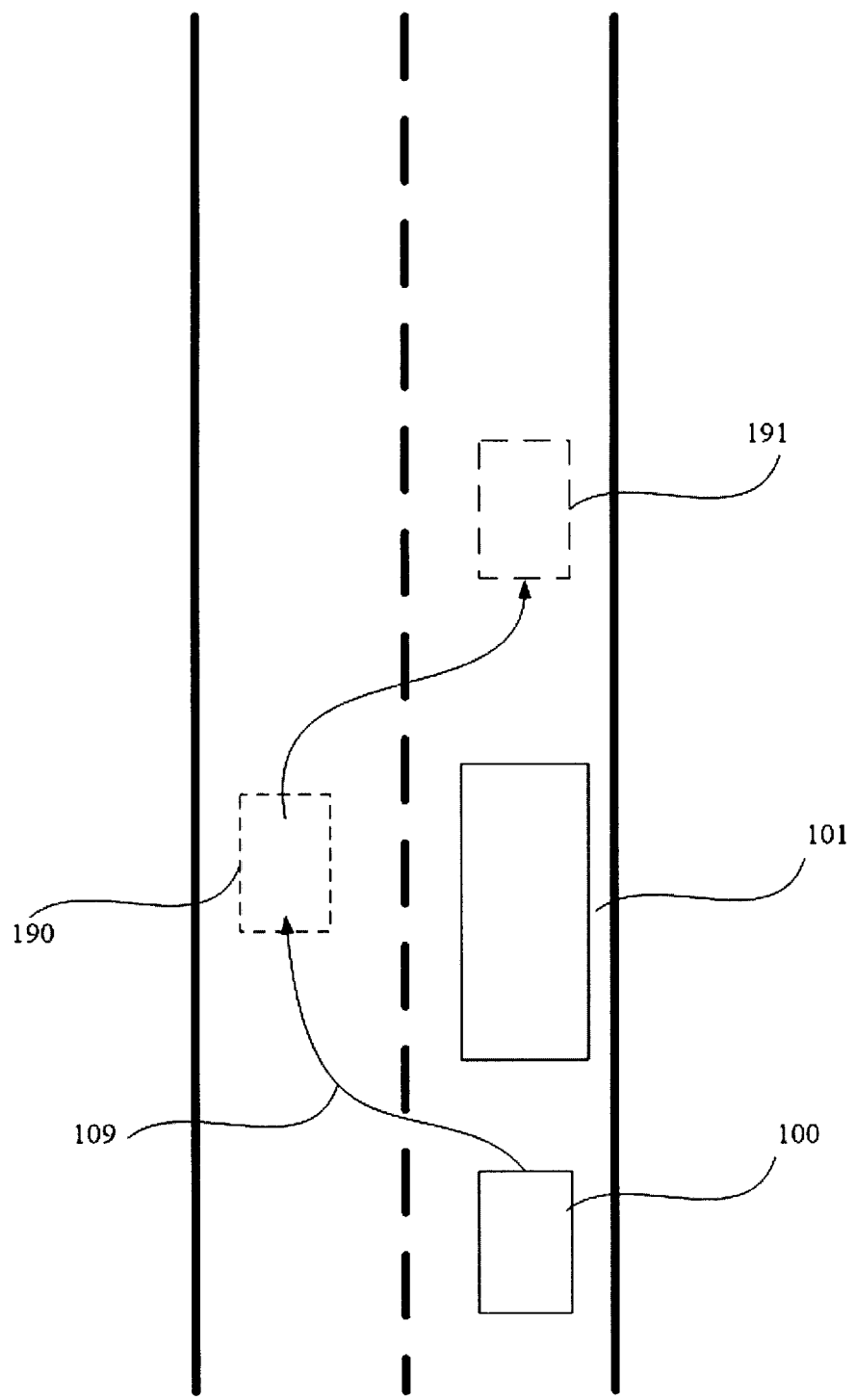

In some embodiments, referring to FIG. 10B, the autonomous driving vehicle 100 confirms that there are no traffic lights in front of the road based on the road condition data provided by the high-precision map. The 22 GHz millimeter-wave radar of the center sensor assembly senses that the truck 101 in front of the autonomous driving vehicle 100 is stationary. So, the truck 101 is temporarily parked on the side of the road, not stop for waiting for a traffic light. The 77 GHz millimeter-wave radar of the at least one edge sensor assembly senses that there is no vehicle on the left lane, so the instruction to be executed can be execute to change lanes. The autonomous driving vehicle 100 follows a path 109 and drives to an intermediate position 190 on the left lane. When the autonomous driving vehicle 100 drives to the intermediate position 190, the autonomous driving vehicle 100 senses the surrounding environment and confirms whether the surrounding environment is suitable for a new execution instruction to be executed. When the surrounding environment is suitable for the new execution instruction to be executed, the autonomous driving vehicle 100 changes lane and drives to predetermined position 191.

In other embodiments, when the autonomous driving vehicle 100 lines up at an entrance of a parking lot to enter the parking lot, combining with feedback based on the high-precision map for the surrounding environment of the autonomous driving vehicle 100, it can be judged that the truck 101 is at rest or is driving at a low speed. The truck 101 obscures part of the perception area of the center sensor assembly of the autonomous driving vehicle 100. The autonomous driving vehicle 100 only needs to turn on left at least one edge sensor assembly to sense whether there are pedestrians or other obstacles in front of the driving direction. The autonomous driving vehicle 100 follow behind the truck 101 at a low speed and there is no need to plan a driving speed anymore.

Figure 10C:
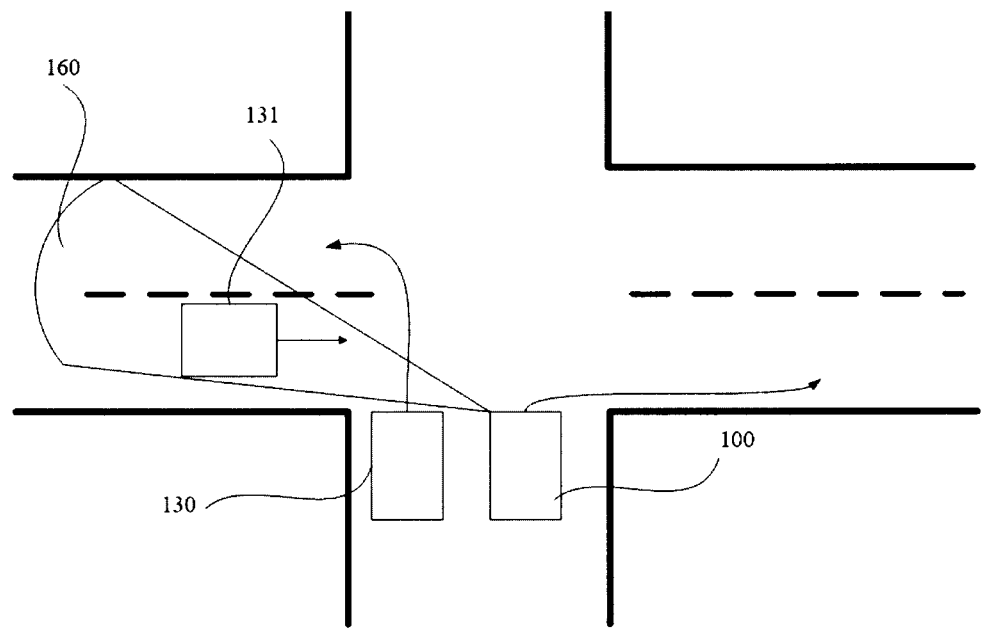

In some embodiments, referring to FIG. 10C, the autonomous driving vehicle 100 drives to an intersection, and sets turn right as the instruction to be executed. On the left side of the autonomous driving vehicle 100, there is a vehicle 130 whose predicted driving trajectory is turning left. The vehicle 130 occludes the perception area of the center sensor assembly about the road conditions on the left side of the intersection. The at least one edge sensor assembly are turned on, and the 77 GHz millimeter-wave radar of the at least one edge sensor assembly senses that there is a vehicle 131 on the left straight lane within the advance perception area 160, and trajectory of the vehicle 131 is straight is predicted. The environment information sensed in advance by the at least one edge sensor assembly is used to make judgements. After the vehicle 131 passes through the intersection, the autonomous driving vehicle 100 executes pre-planned instruction to be executed, which can achieve purpose of advance prediction and safety planning.

Figure 10D:
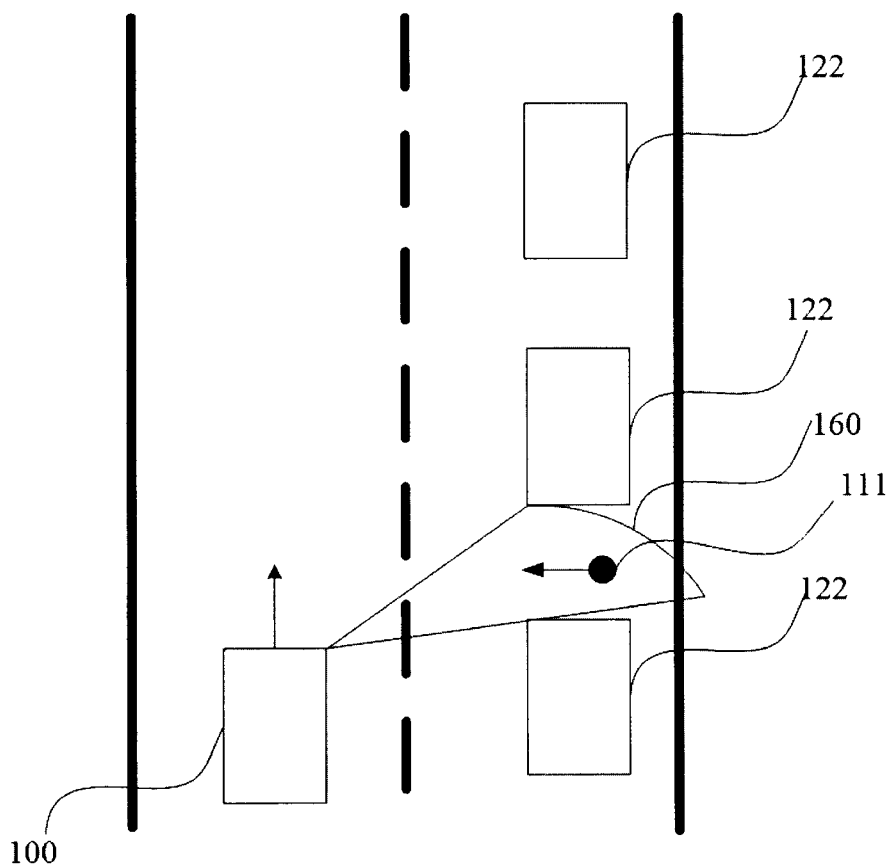

In some embodiments, referring to FIG. 10D, the autonomous driving vehicle 100 drives in an environment full of vehicles on the right side of car body, such as a parking lot. There are not only vehicles but also pedestrians in the parking lot. In the parking lot with a plurality of vehicles, the sensing range of the center sensor assembly is easily obstructed. The at least one edge sensor assembly on the right are turned on to supplement the sensing range of the center sensor assembly. The 24 GHz millimeter-wave radar of the at least one edge sensor assembly is used to sense range of 50 meters on the right front side of the driving direction of the autonomous driving vehicle 100 in advance. When a pedestrian 111 is sensed between the vehicles 122 parked in the perception area, the autonomous driving vehicle 100 can plan to decelerate in advance in order to avoid the pedestrian 111, and wait for the pedestrian 111 until pass.

Figure 10E:
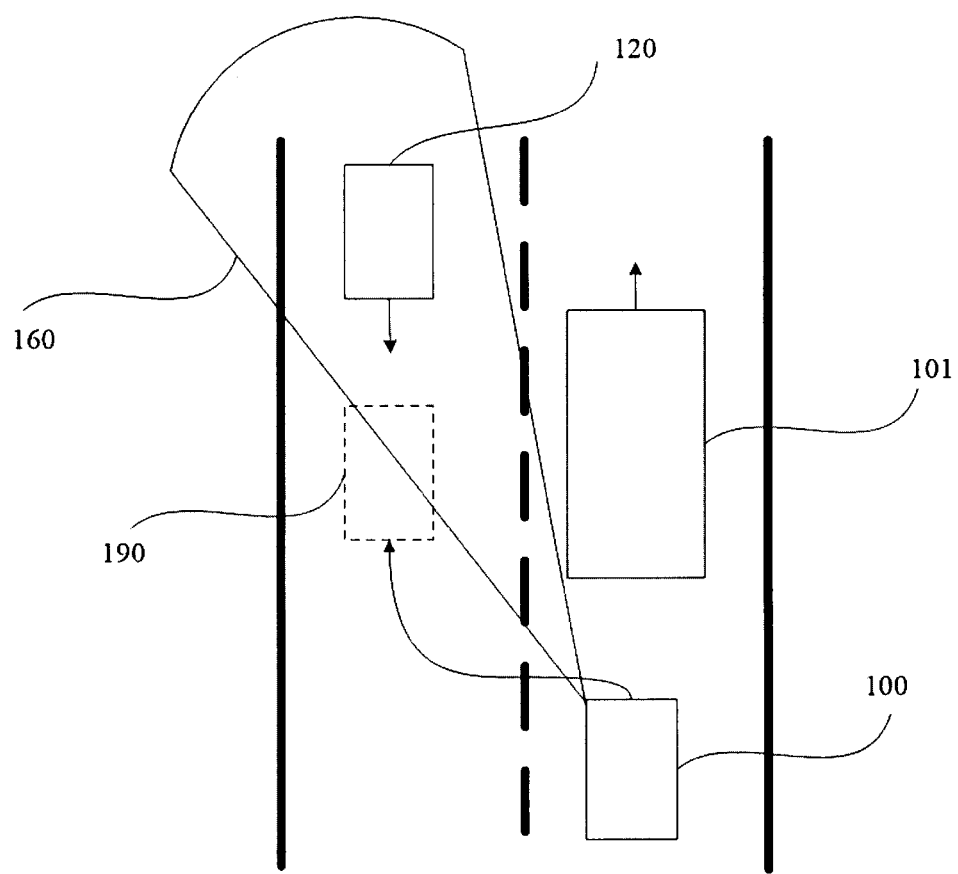

In some embodiments, referring to FIG. 10E, there is a truck 101 in the front of the driving direction of the autonomous driving vehicle 100, and driving speed of the truck 101 is slower than driving speed of the autonomous driving vehicle 100. The instruction to be executed of the autonomous driving vehicle 100 is to overtake from the left lane to the intermediate position 190. Since body of the truck 101 blocks a part of the sensing range of the center sensor assembly, the at least one edge sensor assembly mounted on left are turned on, and the 77 GHz millimeter-wave radar of the at least one edge sensor assembly is used to sense the left lane in advance. Since there is a vehicle 120 in the direction opposite to the driving direction of the autonomous driving vehicle 100 in the advance perception area, the autonomous driving vehicle 100 cannot execute the instruction to overtake from the left to the intermediate position 190. Therefore, the autonomous driving vehicle 100 continues to follow the truck 101 at low speed and waits for a suitable overtaking opportunity.

Figure 9:
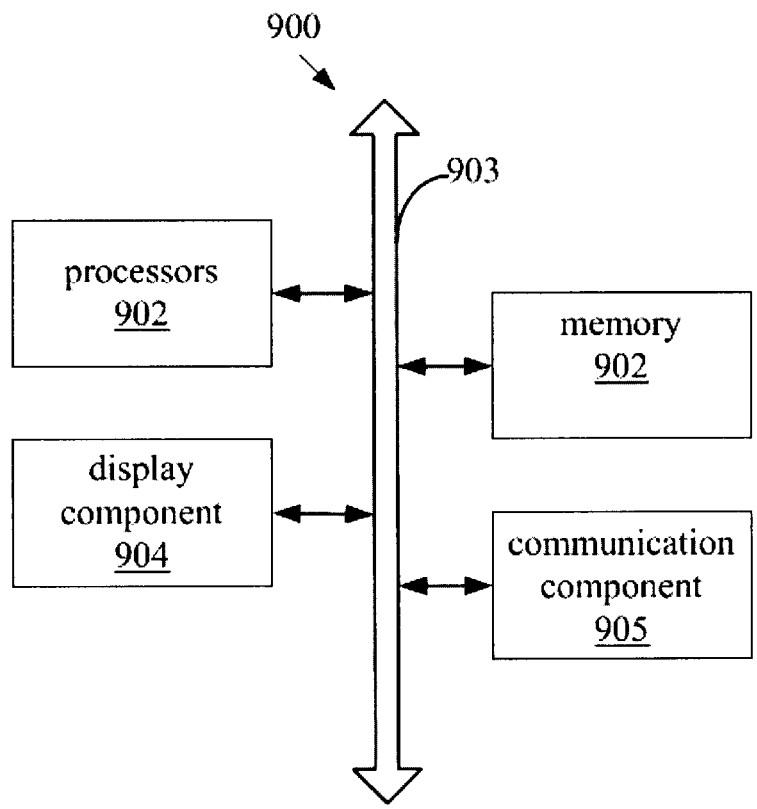
FIG. 9 illustrates a schematic diagram of an intelligent control device.

Referring to FIG. 9, FIG. 9 illustrates a schematic diagram of an intelligent control device. The intelligent control device 900 comprises a memory 901, one or more processors 902, and a bus 903. The memory 901 configured to store program instructions. The one or more processors 902 configured to execute the program instructions to enable the intelligent control device to perform sensing method for an autonomous driving vehicle.

The memory 901 includes at least one type of readable storage medium, which includes flash memory, hard disk, multimedia card, card-type memory (for example, SD or DX memory, etc.), magnetic memory, disk, optical disc, etc. The memory 901 in some embodiments may be an internal storage unit of a computer device, such as a hard disk of a computer device. The memory 901, in other embodiments, can also be a storage device for external computer devices, such as a plug-in hard disk, a Smart Media Card (SMC), a Secure Digital (SD) Card, a Flash Card, etc. equipped on a computer device. Further, the memory 901 may include both the internal and external storage units of a computer device. The memory 901 can not only be used to store the application software and all kinds of data installed in the computer equipment, but also can be used to temporarily store the data that has been output or will be output.

The bus 903 can be either a peripheral component interconnect (PCI) bus or an extended industry standard architecture (EISA) bus. The bus can be divided into address bus, data bus, control bus and so on. For ease of representation, FIG. 9 is represented by a single thick line, but does not indicate that there is only one bus or one type of bus.

Further, the intelligent control device 900 may also include a display component 904. The display component 904 can be LED (Light Emitting Diode) display, LCD display, touch LCD display and OLED (Organic Light-Emitting Diode) touchscreen, etc. The display component 904 may also be appropriately called the display device or display unit for displaying the information processed in the intelligent control device 900 and for displaying the visual user interface.

Further, the intelligent control device 900 may also include a communication component 905. Optionally, the communication component 905 may include a wired communication component and/or a wireless communication component (for example, a WI-FI communication component, a Bluetooth communication component, etc.), which is usually used to establish a communication connection between the intelligent control device 900 and other computer devices.

The processors 902 in some embodiments may be a Central Processing Unit (CPU), controller, microcontroller, microprocessor, or other data processing chip used to run program code or process data stored in the memory 901. In detail, the processors 902 perform sensing program to achieve the sensing method.

FIG. 9 shows the intelligent control device 900 only with components 901-905. To the understanding of technicians in this field, the structure shown in FIG. 9 does not constitute a qualification for the intelligent control device 900, which may include fewer or more components than illustrated, or some combination of components, or a different arrangement of components.

In the above embodiments, it may be achieved in whole or in part by software, hardware, firmware, or any combination thereof. When implemented in software, it can be implemented in whole or in part as a computer program product.

The computer program product includes one or more computer instructions. When the computer program instructions are loaded and executer on a computer, a process or function according to the embodiment of the disclosure is generated in whole or in part. The computer device may be a general-purpose computer, a dedicated computer, a computer network, or other programmable device. The computer instruction can be stored in a computer readable storage medium, or transmitted from one computer readable storage medium to another computer readable storage medium. For example, the computer instruction can be transmitted from a web site, computer, server, or data center to another web site, computer, server, or data center through the cable (such as a coaxial cable, optical fiber, digital subscriber line) or wireless (such as infrared, radio, microwave, etc.). The computer readable storage medium can be any available medium that a computer can store or a data storage device such as a serve or data center that contains one or more available media integrated. The available media can be magnetic (e.g., floppy Disk, hard Disk, tape), optical (e.g., DVD), or semiconductor (e.g., Solid State Disk), etc.

The technicians in this field can clearly understand the specific working process of the system, device and unit described above, for convenience and simplicity of description, can refer to the corresponding process in the embodiment of the method described above, and will not be repeated here.

In the several embodiments provided in this disclosure, it should be understood that the systems, devices and methods disclosed may be implemented in other ways. For example, the device embodiments described above is only a schematic. For example, the division of the units, just as a logical functional division, the actual implementation can have other divisions, such as multiple units or components can be combined with or can be integrated into another system, or some characteristics can be ignored, or does not perform. Another point, the coupling or direct coupling or communication connection shown or discussed may be through the indirect coupling or communication connection of some interface, device or unit, which may be electrical, mechanical or otherwise.

The unit described as a detached part may or may not be physically detached, the parts shown as unit may or may not be physically unit, that is, it may be located in one place, or it may be distributed across multiple network units. Some or all of the units can be selected according to actual demand to achieve the purpose of this embodiment scheme.

In addition, the functional units in each embodiment of this disclosure may be integrated in a single processing unit, or may exist separately, or two or more units may be integrated in a single unit. The integrated units mentioned above can be realized in the form of hardware or software functional units.

The integrated units, when implemented as software functional units and sold or used as independent product, can be stored in a computer readable storage medium. Based on this understanding, the technical solution of this disclosure in nature or the part contribute to existing technology or all or part of it can be manifested in the form of software product. The computer software product stored on a storage medium, including several instructions to make a computer equipment (may be a personal computer, server, or network device, etc.) to perform all or part of steps of each example embodiments of this disclosure. The storage medium mentioned before includes U disk, floating hard disk, ROM (Read-Only Memory), RAM (Random Access Memory), floppy disk or optical disc and other medium that can store program codes.

Referring to FIG. 1, FIG. 1 illustrates a schematic diagram of an autonomous driving vehicle. The autonomous driving vehicle 100 includes a car body, a center sensor assembly 200 setting on roof of the car body, at least one edge sensor assembly 210 setting around the car body of the autonomous driving vehicle 100, and an intelligent control device (not shown). In some embodiments, the center sensor assembly 200 can be mounted to the roof of the autonomous driving vehicle near edge of the front windshield.

It should be noted that the embodiments number of this disclosure above is for description only and do not represent the advantages or disadvantages of embodiments. And in this disclosure, the term "including", "include" or any other variants is intended to cover a non-exclusive contain. So that the process, the devices, the items, or the methods includes a series of elements not only include those elements, but also include other elements not clearly listed, or also include the inherent elements of this process, devices, items, or methods. In the absence of further limitations, the elements limited by the sentence "including a . . . " do not preclude the existence of other similar elements in the process, devices, items, or methods that include the elements.

The above are only the preferred embodiments of this disclosure and do not therefore limit the patent scope of this disclosure. And equivalent structure or equivalent process transformation made by the specification and the drawings of this disclosure, either directly or indirectly applied in other related technical fields, shall be similarly included in the patent protection scope of this disclosure.

The invention claimed is:

1. A sensing method for an autonomous driving vehicle, comprising:
   obtaining an instruction to be executed;
   driving a center sensor assembly, or driving a center sensor assembly and at least one edge sensor assembly to sense corresponding areas to obtain first road condition data according to the instruction to be executed;
   judging whether a first occlusion area appears in the first road condition data;
   calculating a first safety area according to a high-precision map, the first road condition data, and a first preset algorithm when a first occlusion area appears in the first road condition data;
   planning a first execution instruction according to the instruction to be executed, the first road condition data, a driving state of the autonomous driving vehicle, and the first safety area;
   controlling the autonomous driving vehicle to motion in the first safety area according to the first execution instruction;
   driving the at least one edge sensor assembly, or driving the at least one edge sensor assembly and the center sensor assembly to sense the corresponding areas to obtain second road condition data according to the first execution instruction;
   judging whether a second occlusion area appears in the second road condition data; and
   planning a second execution instruction according to the second road condition data and the driving state of the autonomous driving vehicle to control the autonomous driving vehicle to motion according to the second execution instruction when a second occlusion area appears in the second road condition data;
   wherein the center sensor assembly comprises one or more center sensors, one or more center sensors comprise a fixed center sensor and/or a rotatable center sensor; the at least one edge sensor assembly comprises one or more edge sensors, one or more edge sensors comprise a fixed edge sensor and/or a rotatable edge sensor an installation position of the center sensor assembly is different from an installation position of the at least one edge sensor assembly;
   wherein planning a first execution instruction according to the instruction to be executed, the first road condition data, a driving state of the autonomous driving vehicle, and the first safety area comprises:
   planning a vane of adjustment strategies to sense the first occlusion area in the first safety area according to the first occlusion area, a sensing range of the center sensor assembly, or sensing ranges of the center sensor assembly and the at least one edge sensor assembly and the driving state of the autonomous driving vehicle the adjustment strategies comprising selecting one or more of the edge sensors matching the first occlusion area from the one or more edge sensors, selecting angles of the one or more edge sensors, and selecting a position of the autonomous driving vehicle within the first safety area;
   selecting an optimal adjustment strategy from the variety of adjustment strategies according to the position of the autonomous driving vehicle within the first safety area and the driving state of the autonomous driving vehicle;
   planning a driving path for the autonomous driving vehicle to drive to the position within the first safety area according to the position of the autonomous driving vehicle within the first safety area of the optimal adjustment strategy; and
   generating the first execution instruction according to the driving path.

2. The method as claimed in claim 1, wherein planning a driving path for the autonomous driving vehicle to drive to the position within the first safety area according to the position of the autonomous driving vehicle within the first safety area of the optimal adjustment strategy comprises:
   selecting one or more edge sensors that can sense the first occlusion area, and selecting the angles of the one or more selected edge sensors according to the first occlusion area, the sensing range of the center sensor assembly, or the sensing ranges of the center sensor assembly and the at least one edge sensor assembly, and the driving state of the autonomous driving vehicle; and
   calculating the position of the autonomous driving vehicle within the first safety area according to the driving state of the autonomous driving vehicle, the one or more selected edge sensors, and the angles of the one or more selected edge sensors.

3. The method as claimed in claim 1, wherein driving a center sensor assembly, or driving a center sensor assembly and at least one edge sensor assembly to sense corresponding areas to obtain first road condition data according to the instruction to be executed comprises:
   driving the center sensor assembly to sense first sensing data;
   analyzing whether the first occlusion area appears in the first sensing data;
   selecting the at least one edge sensor assembly according to the instruction to be executed when the first occlusion area appears in the first sensing data;
   driving the at least one edge sensor assembly to sense second sensing data; and
   fusing the first sensing data and the second sensing data to obtain the first road condition data.

4. The method as claimed in claim 3, wherein driving the center sensor assembly to sense first sensing data comprises:
   selecting the fixed center sensor and/or the rotatable center sensor from the center sensor assembly according to the instruction to be executed; and
   driving the selected fixed center sensor and/or the selected rotatable center sensor to obtain the first sensing data.

5. The method as claimed in claim 4, wherein driving the selected fixed center sensor and/or the selected rotatable center sensor to obtain the first sensing data comprises:
   determining an optimal angle of the rotatable center sensor according to the first occlusion area in a coordinate system of the autonomous driving vehicle when the rotatable center sensor is selected;
   controlling the rotatable center sensor to rotate to the optimal angle; and driving the rotatable center sensor to sense a corresponding area under the optimal angle to obtain the first sensing data.

6. The method as claimed in claim 1, further comprising:
turning off the at least one edge sensor assembly when the first road condition data obtained by the center sensor assembly does not include the first occlusion area.

7. An intelligent control device, comprising:
a memory configured to store program instructions; and
one or more processors configured to execute the program instructions to enable the intelligent control device to perform sensing method for an autonomous driving vehicle, wherein the sensing method comprises:
obtaining an instruction to be executed;
driving a center sensor assembly, or driving a center sensor assembly and at least one edge sensor assembly to sense corresponding areas to obtain first road condition data according to the instruction to be executed;
judging whether a first occlusion area appears in the first road condition data;
calculating a first safety area according to a high-precision map, the first road condition data, and a first preset algorithm when a first occlusion area appears in the first road condition data;
planning a first execution instruction according to the instruction to be executed, the first road condition data, a driving state of the autonomous driving vehicle, and the first safety area;
controlling the autonomous driving vehicle to motion in the first safety area according to the first execution instruction;
driving the at least one edge sensor assembly or driving the at least one edge sensor assembly and the center sensor assembly to sense the corresponding area to obtain second road condition data according to the first execution instruction;
judging whether a second occlusion area appears in the second road condition data; and
planning a second execration instruction according to the second road condition data and the driving state of the autonomous driving vehicle to control the autonomous driving vehicle to motion according to the second execution instruction when a second occlusion area appears in the second road condition data;
wherein the center sensor assembly comprises one or more center sensors, one or more center sensors comprise a fixed center sensor and/or a rotatable center sensor; the at least one edge sensor assembly comprises one or more edge sensors, one or more edge sensors comprise a fixed edge sensor and/or a rotatable edge sensor; an installation position of the center sensor assembly is different from an installation position of the at least one edge sensor assembly;
wherein planning a first execution instruction according to the instruction to be executed, the first road condition data, a driving state of the autonomous driving vehicle, and the first safety area comprises:
planning a variety of adjustment strategies to sense the first occlusion area in the first safety area according to the first occlusion area, a sensing range of the center sensor assembly, or sensing ranges of the center sensor assembly and the at least one edge sensor assembly, and the driving state of the autonomous driving vehicle, the adjustment strategies comprising selecting one or more of the edge sensors matching the first occlusion area from the one or more edge sensors, selecting angles of the one or more edge sensors, and selecting a position of the autonomous driving vehicle within the first safety area;
selecting an optimal adjustment strategy from the variety of adjustment strategies according to the position of the autonomous driving vehicle within the first safety area and the driving state of the autonomous driving vehicle;
planning a driving path for the autonomous driving vehicle to drive to the position within the first safety area according to the position of the autonomous driving vehicle within the first safety area of the optimal adjustment strategy; and
generating the first execution instruction according to the driving path.

8. The intelligent control device as claimed in claim 7, wherein planning a driving path for the autonomous driving vehicle to drive to the position within the first safety area according to the position of the autonomous driving vehicle within the first safety area of the optimal adjustment strategy comprises:
selecting one or more edge sensors that can sense the first occlusion area, and selecting the angles of the one or more selected edge sensors according to the first occlusion area, the sensing range of the center sensor assembly, or the sensing ranges of the center sensor assembly and the at least one edge sensor assembly, and the driving state of the autonomous driving vehicle; and
calculating the position of the autonomous driving vehicle within the first safety area according to the driving state of the autonomous driving vehicle, the one or more selected edge sensors, and the angles of the one or more selected edge sensors.

9. The intelligent control device as claimed in claim 7, wherein driving a center sensor assembly, or driving a center sensor assembly and at least one edge sensor assembly to sense corresponding areas to obtain first road condition data according to the instruction to be executed comprises:
driving the center sensor assembly to sense first sensing data;
analyzing whether the first occlusion area appears in the first sensing data;
selecting the at least one edge sensor assembly according to the instruction to be executed when the first occlusion area appears in the first sensing data;
driving the at least one edge sensor assembly to sense second sensing data; and
fusing the first sensing data and the second sensing data to obtain the first road condition data.

10. The intelligent control device as claimed in claim 9, wherein driving the center sensor assembly to sense first sensing data comprises:
selecting the fixed center sensor and/or the rotatable center sensor from the center sensor assembly according to the instruction to be executed; and
driving the selected fixed center sensor and/or the selected rotatable center sensor to obtain the first sensing data.

11. The intelligent control device as claimed in claim 10, wherein driving the selected fixed center sensor and/or the selected rotatable center sensor to obtain the first sensing data comprises:
determining an optimal angle of the rotatable center sensor according to the first occlusion area in a coordinate system of the autonomous driving vehicle when the rotatable center sensor is selected;
controlling the rotatable center sensor to rotate to the optimal angle; and driving the rotatable center sensor to sense a corresponding area under the optimal angle to obtain the first sensing data.

12. The intelligent control device as claimed in claim 7, further comprising:
turning off the at least one edge sensor assembly when the first road condition data obtained by the center sensor assembly does not include the first occlusion area.

13. An autonomous driving vehicle, comprising:
a car body;
a center sensor assembly setting on roof of the car body;
at least one edge sensor assembly setting around the car body; and
an intelligent control device, the intelligent control device comprising:
a memory configured to store program instructions; and
one or more processors configured to execute the program instructions to enable the intelligent control device to perform sensing method for an autonomous driving vehicle, wherein the sensing method comprising:
obtaining an instruction to be executed;
driving a center sensor assembly, or driving a center sensor assembly and at least one edge sensor assembly to sense corresponding areas to obtain first road condition data according to the instruction to be executed;
judging whether a first occlusion area appears in the first road condition data;
calculating a first safety area according to a high-precision map, the first road condition data, and a first preset algorithm when a first occlusion area appears in the first road condition data;
planning a first execution instruction according to the instruction to be executed, the first road condition data, a driving state of the autonomous driving vehicle, and the first safety area;
controlling the autonomous driving vehicle to motion in the first safety area according to the first execution instruction;
driving the at least one edge sensor assembly or driving the at least one edge sensor assembly and the center sensor assembly to sense the corresponding area to obtain second road condition data according to the first execution instruction;
judging whether a second occlusion area appears in the second road condition data; and
planning a second execution instruction according to the second road condition data and the driving state of the autonomous driving vehicle to control the autonomous driving vehicle to motion according to the second execution instruction when a second occlusion area appears in the second road condition data;
wherein the center sensor assembly comprises one or more center sensors, one or more center sensors comprise a fixed center sensor and/or a rotatable center sensor; the at least one edge sensor assembly comprises one or more edge sensors, one or more edge sensors comprise a fixed edge sensor and/or a rotatable edge sensor; an installation position of the center sensor assembly is different from an installation position of the at least one edge sensor assembly;
wherein planning a first execution instruction according to the instruction to be executed, the first road condition data, a driving state of the autonomous driving vehicle, and the first safety area comprises:
planning a variety of adjustment strategies to sense the first occlusion area in the first safety area according to the first occlusion area, a sensing range of the center sensor assembly, or sensing ranges of the center sensor assembly and the at least one edge sensor assembly, and the driving state of the autonomous driving vehicle, the adjustment strategies comprising selecting one or more of the edge sensors matching the first occlusion area from the one or more edge sensors, selecting angles of the one or more edge sensors, and selecting a position of the autonomous driving vehicle within the first safety area;
selecting an optimal adjustment strategy from the variety of adjustment strategies according to the position of the autonomous driving vehicle within the first safety area and the driving state of the autonomous driving vehicle;
planning a driving path for the autonomous driving vehicle to drive to the position within the first safety area according to the position of the autonomous driving vehicle within the first safety area of the optimal adjustment strategy; and
generating the first execution instruction according to the driving path.

14. The autonomous driving vehicle as claimed in claim 13, further comprising:
turning off the at least one edge sensor assembly when the first road condition data obtained by the center sensor assembly does not include the first occlusion area.

* * * * *